March 10, 1959  S. H. M. DODINGTON  2,877,344
TRANSMITTER-RECEIVER TUNING SYSTEM
Filed Aug. 29, 1955
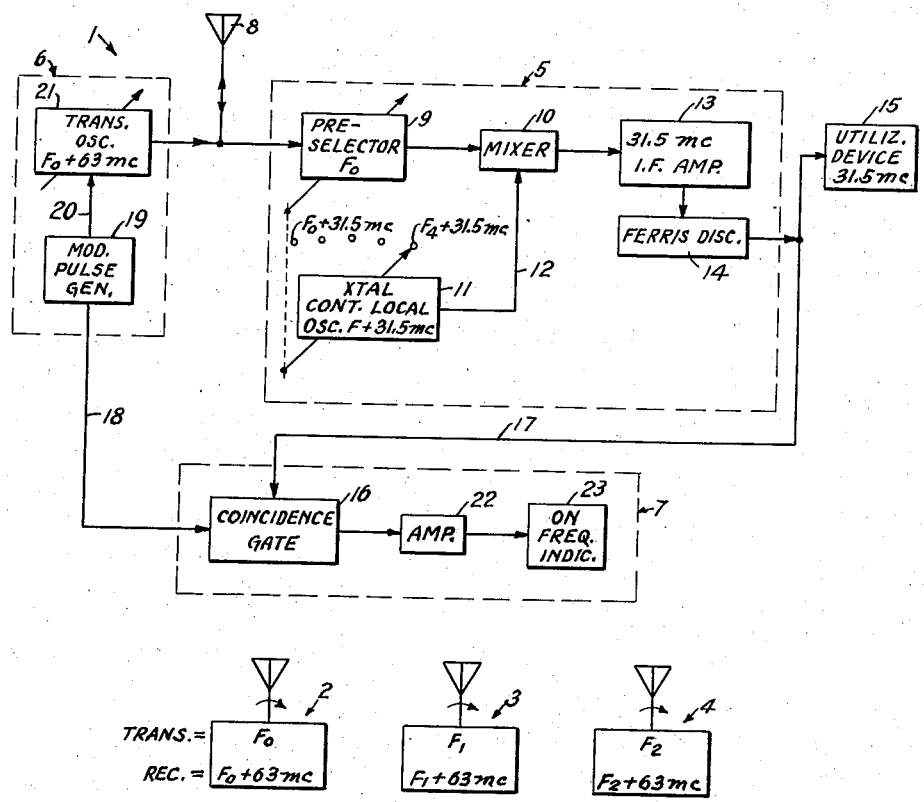
INVENTOR
SVEN H. M. DODINGTON
BY Philip M. Bolton
ATTORNEY

United States Patent Office 2,877,344
Patented Mar. 10, 1959

2,877,344

TRANSMITTER-RECEIVER TUNING SYSTEM

Sven H. M. Dodington, Nutley, N. J., assignor to International Telephone and Telegraph Corporation, Nutley, N. J., a corporation of Maryland Application August 29, 1955, Serial No. 531,025

5 Claims. (Cl. 250—13)

This invention relates to a transmitter-receiver system tunable over a given frequency range and particularly one in which the transmitter and receiver frequencies are to be kept separate by a fixed amount throughout said range.

In many transmitter-receiver systems in which a transmitter and a receiver are at the same location, it is required that the transmitter and receiver frequencies be kept separate by a given amount. A typical example of this is in the airborne equipment of the aerial navigation system called "Tacan." In this system equipment in an airplane cooperates with equipment in a ground or beacon station to indicate the bearing and distance of the airplane with respect to the ground station with which it is communicating. In obtaining the bearing information, pulses are transmitted from the ground station and received by the airplane, the pulses being amplitude modulated at the ground station by a rotating antenna system so that the phase of the modulation envelope varies in accordance with the direction of the airplane from the ground station. In obtaining the distance information, interrogation pulses are sent from the airplane to the ground station which operates as a transponder in repeating said pulses back to the airplane, the repeated or reply pulses being usually interspersed among the usual beacon or bearing-information pulses. The travel time of the interrogation pulses from the airplane to the ground and back is used to determine the distance of the airplane from the station.

In the foregoing system it is required that the airplane tune its receiver to a ground station, usually the nearest one, and that it likewise tune its transmitter to transmit to the selected ground station. Each ground station has a different pair of frequencies assigned thereto with the frequencies of the pair, the ground station transmitter and receiver frequencies, being separated by a predetermined amount such as, for example, 63 megacycles. Likewise the airplane equipment transmitter and receiver are required to be separated by the same amount (i. e., 63 mc.) although both the airplane transmitter and receiver are adapted to be tuned to different frequencies within a given range to communicate with different ones of the ground stations, usually a nearby one, as the airplane moves along its route. Tuning means for the receiver can be relatively simple and inexpensive and consist of crystals of different frequency characteristics which are switched into the local oscillator circuit to thereby receive the selected one of the ground station. On the other hand, tuning equipment for the transmitter tends to be much more complex and expensive involving the use of crystals, multipliers and power amplifiers. Such transmitter equipment is ordinarily too expensive for private flyers and simpler transmitter equipment such as a self-excited oscillator is preferable, if some means is provided to enable the transmitter to be accurately tuned with respect to the selected receiver frequency so that it is separated by the required amount.

An object of the present invention is the provision of a transmitter-receiver system, tunable to different frequencies within a given range, which enables setting the proper transmitter-receiver frequency separation at any selected frequency in the range.

Another object of the present invention is the provision of simple and relatively inexpensive apparatus for carrying out the above object.

The main feature of the present invention is that the system is arranged so that at the proper frequency separation the transmitter is tuned to the image frequency of the receiver and pulses from the transmitter are passed directly through the receiver, being distinguished by coincidence gating from other pulses received from an outside transmitter, such as from a ground station, the "passed" pulses indicating that the transmitter frequency is properly tuned and separated from the frequency at which the receiver is tuned by the required amount.

Other and further objects of the present invention will become apparent, and the foregoing will be better understood with reference to the following description of an embodiment thereof, reference being had to the drawing, in which the figure is a block diagram of a transmitter-receiver tuning system for use in a Tacan airborne equipment also showing cooperating ground stations.

In carrying out the invention the I.-F. is selected so that the transmitter frequency is at the proper separation from the receiver frequency when the transmitter is tuned to the image frequency of the receiver. First, the receiver is tuned to the desired ground station by adjusting the local oscillator. This may be accomplished by switching into the local oscillator circuit the desired one of a number of frequency determining crystals of different frequency characteristics. The transmitter, which is being modulated to emit R.-F. pulses according to a unique spacing pattern determined by an unstable pulse generator on the airplane, is connected to a common antenna with the receiver and thereby to the receiver input. The transmitter is continuously tuned until it is at the image frequency of the receiver. The system is arranged so that when the transmitter is at the image frequency of the receiver, pulses from the transmitter pass through the receiver and are applied to a coincidence gate simultaneously with corresponding pulses directly applied to said gate from said pulse generator. The coincidence of the directly applied pulses and those from the output of the receiver causes the coincidence gate to produce an output which operates an indicator to produce an indication that the transmitter is at the image frequency whereupon further tuning ceases and the proper separation between the transmitter and receiver frequency is obtained. The coincidence gate serves to prevent external pulses, such as might be received from the ground station, from producing a false indication of proper transmitter tuning.

Turning to the details of the foregoing system and particularly referring to the drawing, a transmitter-receiver system 1, for an airplane, is adapted to communicate with any one of a plurality of ground stations 2, 3, or 4, etc. Each of the ground stations 2, 3, or 4, etc. transmits at a different frequency $F_0$, $F_1$, $F_2$, etc., respectively, and receives at a frequency differing from its transmitted frequency by a given amount, such as for example +63 mc. Thus, station 2 transmits at $F_0$ and receives at $F_0+63$ mc., station 3 transmits at $F_1$ and receives at $F_1+63$ mc., station 4 transmits at $F_2$ and receives at $F_2+63$ mc., etc. Pulses are being continually transmitted from each of the ground stations, the pulses being amplitude modulated at the ground station by a rotating antenna system so that the phase of the modulation envelope varies in accordance with the direction of the airplane from the ground station. The ground stations also serve as transponders which emit pulses in response to interrogation pulses received from the airplane transmitter.

The airplane transmitter-receiver equipment includes a superheterodyne receiver 5, a transmitter 6, and an auxiliary section 7 used to indicate when the transmitter is properly tuned with respect to the receiver frequency.

The transmitter 5 and receiver 6 are coupled to a common antenna 8 as well as to each other. The receiver may include a preselector 9 in the form of a tunable bandpass filter such as tuned cavities resonators, the preselector 9 being coupled to a mixer 10, which is fed with local oscillations from a crystal controlled oscillator 11, via line 12. The crystal controlled local oscillator may include as its tuning means a plurality of frequency determining crystals each of a different frequency, the different crystals being switched into the oscillator circuit in order to select different frequencies. The tuning of the preselector 9 may be mechanically ganged to the local oscillator switching control to correspondingly vary the tuning thereof. The output of the mixer 10 is fed through one or more stages of an I.-F. amplifier 13 to a Ferris discriminator 14, which together provide sharp cutoff and narrow band characteristics. The output of the Ferris discriminator is a video pulse.

For further details as to the Ferris discriminator or similar types of discriminators reference is had to Electrical Communication 1949, "Crystal Controlled Thousand Megacycles for Aerial Navigation." Also see my copending United States application for "Frequency Discriminator Circuit," Serial No. 512,974, filed June 3, 1955.

The I.-F. amplifier and Ferris discriminator are each tuned to select a frequency equal to half the difference between the frequency difference which is to be maintained between the transmitter and receiver frequencies. Thus, for example, if the difference between the receiver and the transmitter frequency is 63 mc. then the I.-F. frequency is half of that, or 31.5 mc. In conformity therewith the local oscillator is tuned to a frequency different from the incoming frequency by the amount of the I.-F. frequency, that is, 31.5, so that if the receiver frequency is "F" the local oscillator frequency is $F \pm 31.5$. It will be seen that the image frequency of the receiver in the given example will be $F+63$ mc. which is the frequency at which the transmitter will be properly spaced from the receiver frequency.

The video pulse output of stage 14 may be fed to some suitable utilization device 15, which is of no immediate concern in the present invention, and is also fed to a coincidence gate 16 in the auxiliary section 7.

The coincidence gate 16 is also directly fed via line 18 with pulses from a pulse generator 19 whose pulses are also applied to the transmitter via line 20 to modulate the transmitter which may consist of a self-excited oscillator 21 adapted to be tuned over a range of frequencies. The output of the transmitter oscillator 21 is fed to the common antenna 8 and to the receiver 5. The pulse generator 19 is preferably an unstable generator such as a blocking oscillator, so that its output pulse spacing pattern tends to have a certain amount of irregularity and be unique so that the pulses generated thereby may be distinguished from other pulses. This enables the coincidence circuit to distinguish these pulses from other external pulses, such as for example those received from the ground station, as will be apparent from the description of the operation of the system.

The operation of the foregoing system is as follows. Assuming that it is desired to communicate with ground station 2, which has, for example, a transmission frequency of $F_0$ and a receiver frequency of $F_0+63$ mc., the receiver 5 is tuned by switching the appropriate crystal into the local oscillator circuit to produce local oscillations at frequency $F_0+31.5$ mc. This likewise tunes the preselector and the receiver is set to receive at the desired frequency $F_0$. It now becomes necessary to set the transmitter oscillator 21 at a frequency $F_0+63$ mc. This is accomplished by varying the tuning of the oscillator 21, which is being modulated by pulse generator 19. When the oscillator 21 is tuned to frequency $F_0+63$ mc. the pulses at said frequency emitted by said oscillator 21 pass through the preselector which is tuned to $F_0$ with an attenuation sufficient to prevent overloading the mixer and the subsequent stages of the I.-F. amplifier 13. These pulses of $F_0+63$ mc. are mixed with the local oscillator energy of $F_0+31.5$ mc. and the difference frequency of 31.5 mc. is selected and passed via I.-F. amplifier 13 and detected in the Ferris discriminator 14. The detected pulses are fed along line 17 to the coincidence gate 16. Simultaneously, pulses are applied by pulse generator 19 to the coincidence gate 16 and since the pulses fed along lines 17 and 18 both have the same timing, they coincide in coincidence gate 16 to produce an output which may be integrated, or added, in amplifier 22 and from thence applied to the "on-frequency" indicator 23. The indicator 23 may consist of a voltmeter such as a bridge-type vacuum tube voltmeter, and will give a maximum reading when the transmitter is exactly tuned to the image frequency of the receiver. The coincidence gate 16 serves to prevent the indicator 23 from giving a false reading due to pulses which may be picked up on antenna 8, most probably from ground station 2. Since pulses received on antenna 8 from ground station 2 would not have the unique pulse spacing pattern produced by the unstable pulse generator 19, they would not produce a sufficient number of coincidences in coincidence gate 16 to cause the indicator 23 to give a false indication. Furthermore, the reply pulses emitted by ground station 2 in response to interrogation pulses transmitted from oscillator 21 would not affect the coincidence gate since they would be delayed by the travel time required to go from the antenna 8 to ground station 2 and back to antenna 8 as well as the delay within the circuitry of the ground station. Thus, the only pulses able to pass through coincidence gate 16 to operate the indicator 23 would be those pulses transmitted from the transmitter oscillator 21 directly to the receiver, and only at such time as when the oscillator 21 is tuned to the image frequency of the receiver. Otherwise these latter pulses would not pass through the receiver. When the oscillator reaches said image frequency the indicator 23 will indicate this point and the transmitter is then set at the desired frequency. While the transmitter may be manually tuned as indicated hereinabove, it will be apparent that this tuning may be automatically accomplished by using servo controls which are in turn controlled by the output of the coincidence gate to halt at the proper transmitter frequency. However, where expense is to be kept at a minimum and greater simplicity desired, the manual means is preferable.

While I have described my invention above with reference to a specific embodiment, it is to be understood that the invention is to be interpreted according to the state of the prior art and the appended claims.

I claim:

1. A transmitter-receiver tuning system in which the receiver is tunable over a range of frequencies and the transmitter is to be tuned with respect to the receiver frequency so as to provide a given frequency separation between the transmitter and receiver over said range comprising a superheterodyne receiver, a tunable transmitter, means for coupling the output of the transmitter to the receiver, means in said receiver for tuning the receiver so that the image frequency thereof is equal to the frequency of the transmitter at which the desired frequency separation is obtained, and means coupled to an output of said transmitter and to the output of said receiver to indicate when the frequency separation between the transmitter and receiver operating frequencies equal said given frequency separation.

2. A transmitter-receiver tuning system in which the receiver is tunable over a range of frequencies and the transmitter is to be tuned with respect to the receiver frequency so as to provide a given frequency separation between the transmitter and receiver over said range comprising a superheterodyne receiver having mixer, local oscillator an I.-F. amplifier and a frequency discriminator, a tunable transmitter, means for coupling the output of the transmitter to the receiver, said I.-F. amplifier being of a character having a frequency equal to half the desired frequency separation so that the image frequency of the receiver is equal to the frequency of the transmitter at which the desired frequency separation is obtained, and means coupled to an output of said transmitter and to the output of said frequency discriminator to indicate when the frequency separation between the transmitter and receiver operating frequencies equal said given frequency separation.

3. A transmitter-receiver tuning system in which the receiver is tunable over a range of frequencies and the transmitter is to be tuned with respect to the receiver frequency so as to provide a given frequency separation between the transmitter and receiver over said range comprising a superheterodyne receiver having mixer, local oscillator an I.-F. amplifier and a frequency discriminator, a tunable transmitter, a pulse generator, means for applying the pulses from said generator to modulate said transmitter, means for coupling the output of the transmitter to the receiver, said I.-F. amplifier being of a character having a frequency equal to half the desired frequency separation so that the image frequency of the receiver is equal to the frequency of the transmitter at which the desired frequency separation is obtained, and means coupled to an output of said pulse generator and to the output of said frequency discriminator to indicate when the frequency separation between the transmitter and receiver operating frequencies equal said given frequency separation.

4. A transmitter-receiver system in which the receiver is tunable over a range of frequencies and the transmitter is to be tuned with respect to the receiver frequency so as to provide a given frequency separation between the transmitter and receiver over said range, said receiver being coupled to a transmission medium and adapted to receive pulses thereover, comprising a superheterodyne receiver having mixer, local oscillator and an I.-F. amplifier, a tunable transmitter, a pulse generator, means for applying the pulses from said generator to modulate said transmitter, means for coupling the output of the transmitter to the receiver, said I.-F. amplifier being of a character having a frequency equal to half the desired frequency separation so that the image frequency of the receiver is equal to the frequency of the transmitter at which the desired frequency separation is obtained, means for deriving pulse signals from the receiver when the transmitter is tuned to said image frequency, a coincidence gate, means for applying pulses from said pulse generator and from said receiver to said coincidence gate, and means responsive to the output from said coincidence gate for indicating when the frequency separation between the transmitter and receiver operating frequencies equal said given frequency separation.

5. A system according to claim 4 in which said pulse generator is relatively unstable so as to produce a pulse spacing output pattern which is irregular.

References Cited in the file of this patent

UNITED STATES PATENTS

| | | |
|---|---|---|
| 2,425,013 | Stotz | Aug. 5, 1947 |
| 2,469,875 | Fyler | May 10, 1949 |
| 2,671,896 | De Rosa | Mar. 9, 1954 |
| 2,684,478 | Fox | July 20, 1954 |
| 2,704,323 | Ieu-Liang Wu | Mar. 15, 1955 |
| 2,725,555 | Hopper | Nov. 29, 1955 |
| 2,777,054 | Dahlberg | Jan. 8, 1957 |
| 2,788,520 | Arenberg et al. | Apr. 9, 1957 |